United States Patent [19]

Norberg et al.

[11] 4,298,860
[45] Nov. 3, 1981

[54] MONITOR AND CONTROL APPARATUS

[75] Inventors: Gayle R. Norberg, Columbia Heights; Lee R. Hartung, Coon Rapids, both of Minn.

[73] Assignee: Control Data Corporation, Minneapolis, Minn.

[21] Appl. No.: 129,054

[22] Filed: Mar. 10, 1980

[51] Int. Cl.³ .............................................. H04Q 9/00
[52] U.S. Cl. ........................... 340/825.04; 340/825.07; 340/825.16; 340/825.22
[58] Field of Search ......... 340/147 P, 147 LP, 152 R, 340/147 R, 163, 147 C

[56] References Cited

U.S. PATENT DOCUMENTS

| | | | |
|---|---|---|---|
| 3,828,313 | 8/1974 | Schull et al. | 340/163 |
| 3,832,688 | 8/1974 | Strojny et al. | 340/147 R |
| 3,903,507 | 9/1975 | Dillingham | 340/147 P |
| 3,922,486 | 11/1975 | De Jean | 340/168 S |
| 4,048,620 | 9/1977 | Crandall et al. | 340/152 R |
| 4,114,138 | 9/1978 | Demers | 340/168 R |
| 4,174,064 | 11/1979 | Pratt, Jr. | 340/147 R |
| 4,234,949 | 11/1980 | Gray, Jr. | 340/147 LP |

*Primary Examiner*—Donald J. Yusko
*Attorney, Agent, or Firm*—Robert M. Angus; Joseph A. Genovese

[57] ABSTRACT

A monitor and control apparatus according to the present disclosure includes a configuration and environment monitor (CEM) connected to a plurality of remote station monitors of a computer system for executing commands at the remote stations and for monitoring abnormal conditions thereat. The remote monitors each include a Johnson counter responsive to clock signals from the CEM to sequentially step through its output positions. Address means is selectively connected to first output positions of the Johnson counter to provide a unique address for each remote monitor. Monitor means receives monitor condition signals and is arranged with a transmitter to transmit a signal to the CEM upon sensing a fault. The CEM then sequences the Johnson counters to cause the address and fault identification data in the operated monitor to be transmitted to the CEM. Control means is provided to perform selected control operations at the remote station, the control means being connected to second output positions of the Johnson counter. Selective means is responsive to address signals from the CEM on a select channel to disable all control means in remote stations whose address is other than that received. Control signals on the select channel then operates the selected command in the addressed monitor.

29 Claims, 7 Drawing Figures

MONITOR AND CONTROL APPARATUS

This invention relates to monitor and control apparatus, and particularly to apparatus for monitoring conditions appearing in remote stations (such as peripheral or ancillary equipment) of a computer controlled system and for initiating commands to control operations in the peripheral remote station.

With the advent of large scale computer systems, a growing need has arisen for greater monitoring and control over remote peripheral stations. It has been possible to detect malfunctions in peripheral remote stations by virtue of inaccurate data received therefrom, as well as parity checks, but often an equipment malfunction may cause a power failure at the remote station so it is not altogether possible to determine the cause of failure at the central station (such as at the central processor unit—CPU). Further, it has not been altogether possible to initiate or command functions at selected peripheral stations without either affecting the system as a whole, or inserting command data onto the data channels, thereby wasting valuable data communications capabilities for the system to affect commands of one or more peripheral remote stations. For example, in the event of malfunction of a particular peripheral remote station and/or the desirability to shut down a particular peripheral remote station, it has been the practice to address the station to command it to shut down. However, such addressing and command required use of the data communications channels, thereby tying up the data channels with command functions when the channels might be used for data transmission between the CPU and other remote stations. The addition of these operations to the data handling aspects of the system also added undesirable complexity to programs ordinarily used primarily for data processing and transfer. Another example resides in system start-up techniques. In the past system start-up required the supplying of sufficient power (operating current) to start all peripheral stations on the system simultaneously. During start-up a peripheral station ordinarily draws more current than is ordinarily needed during normal running operations, this being occasioned in part by the fact that many peripheral stations remain in a stand-by mode for a large portion of their operating time. Furthermore, it has become increasingly important to conserve power, so it is desirable to be able to selectively shut down peripheral equipment during periods of inactivity. Before the present invention, it has not been altogether practical to effectuate start-up or operation of peripheral remote stations on a selective basis from the central station.

The present invention is directed to apparatus for monitoring and providing commands to a plurality of remote stations on a selective basis, and with the present invention accurate condition monitoring in remote stations may be accomplished and accurate command controls may be accomplished on a selective basis. Particularly, the present invention provides a monitor and control apparatus for performing monitor and control functions to a plurality of remote stations without using the data channels of the computer system.

In accordance with the present invention, a configuration and environment monitor (CEM) is connected to each of the remote station monitor and control units via a select channel, a clock channel and a power channel. Each remote station includes a counter, or counter-and-gate combination, responsive to clock signals to sequentially step through its output positions. The counter or counter-and-gate combination produces one unique enable output at each of its states in sequence; a Johnson counter being a preferred counter-and-gate combination. Address means is connected to first output positions of the Johnson counter to provide a unique binary address for the remote station monitor and control unit. Monitor means is provided to receive monitor signals representative of various monitored conditions at the remote station. Transmitter means at the remote station transmit a signal indication of a fault condition to the CEM causing the CEM to initiate an interrogation sequence. The monitor means are connected to second output positions of the Johnson counter such that when the CEM interrogates the remote stations, the station sensing the fault will respond via transmitter means coupled to the address means and monitor means with a binary message containing its address and the data indicative of the fault.

One feature of the present invention resides in the provision of control means, enabled by a deselect means for controlling various functions of the remote station, such as "on", "off" or monitor control. The deselect means comprises selective means responsive to the successive bits of an address signal transmitted by the CEM on the select channel. If an address bit is received which does not correspond to that of the respective station in the sequence, the selective means operates to set the disable means, so that only that station whose address is transmitted by the CEM has its control means still enabled at the end of the address sequence.

Another feature of the present invention resides in the fact that if the CEM sends no address, none of the stations will be deselected, so that a subsequent command will be received by all stations.

Another feature of the present invention resides in the fact that the deselection function may be combined with the control function to selectively disable a specific remote station or group thereof for control purposes.

Another feature of the present invention resides in the fact the status of the monitors at a selected station or group of stations may be ascertained by deselection of all other stations and thereafter initiating an interrogation sequence from the CEM.

Another feature of the present invention resides in the use of the command function to selectively start-up or disable selected stations or groups of stations.

The above and other features of this invention will be more fully understood from the following detailed description, and the accompanying drawings, in which:

FIGS. 2A, 2B and 2C, when edge matched such that FIG. 2C is to the right of FIG. 2A and FIG. 2B is below FIGS. 2A and 2C, illustrate a block circuit diagram of a remote monitor and control unit for use in the system illustrated in FIG. 1;

Figure 1:
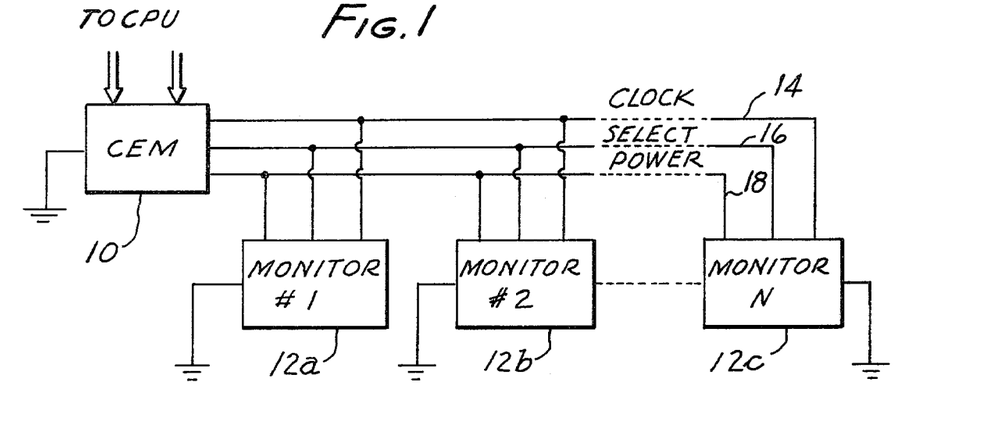
FIG. 1 is a block circuit diagram of a monitor and control system in accordance with the presently preferred embodiment of the present invention.
Figure 2A:
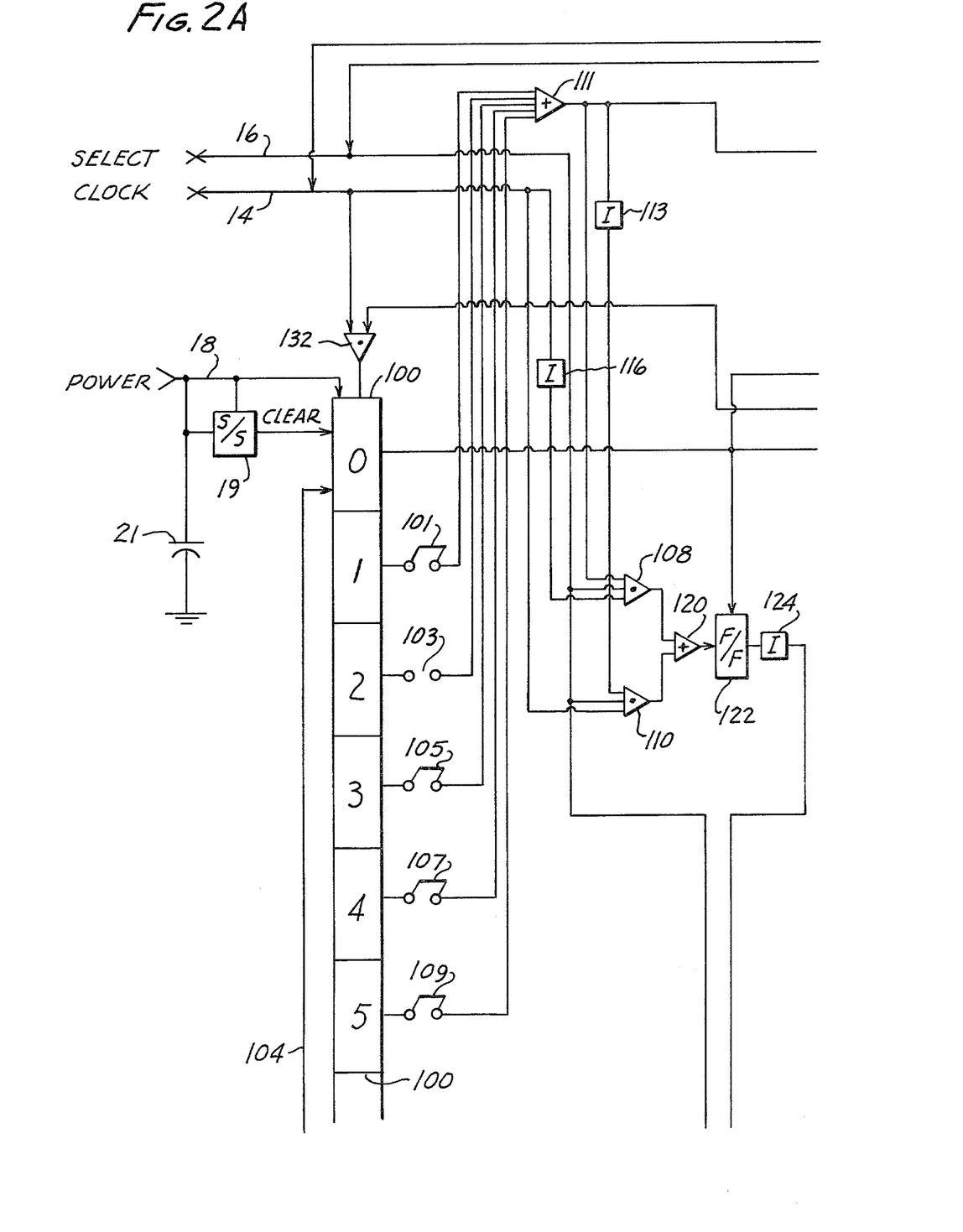
Figure 2B:
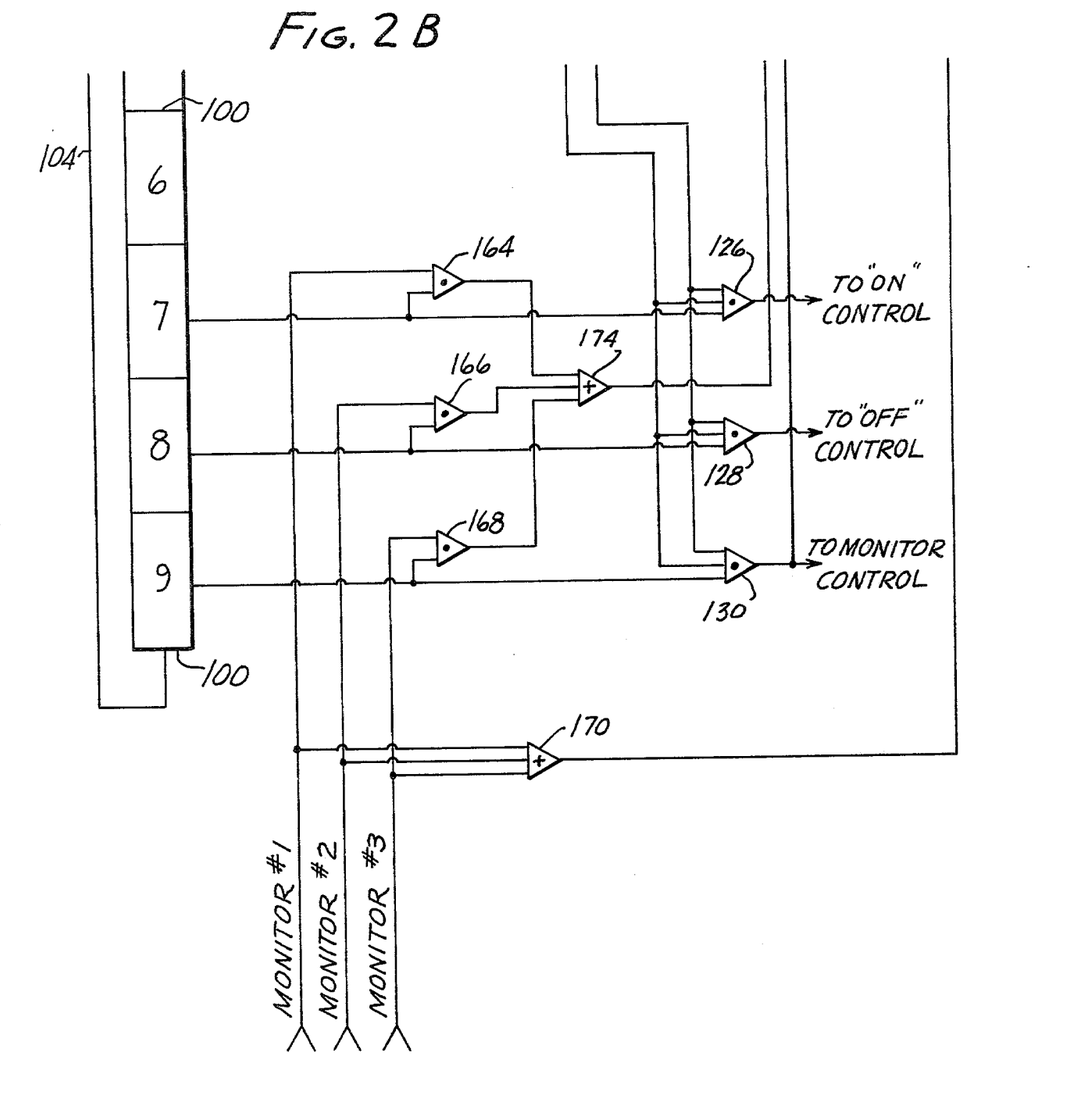
Figure 2C:
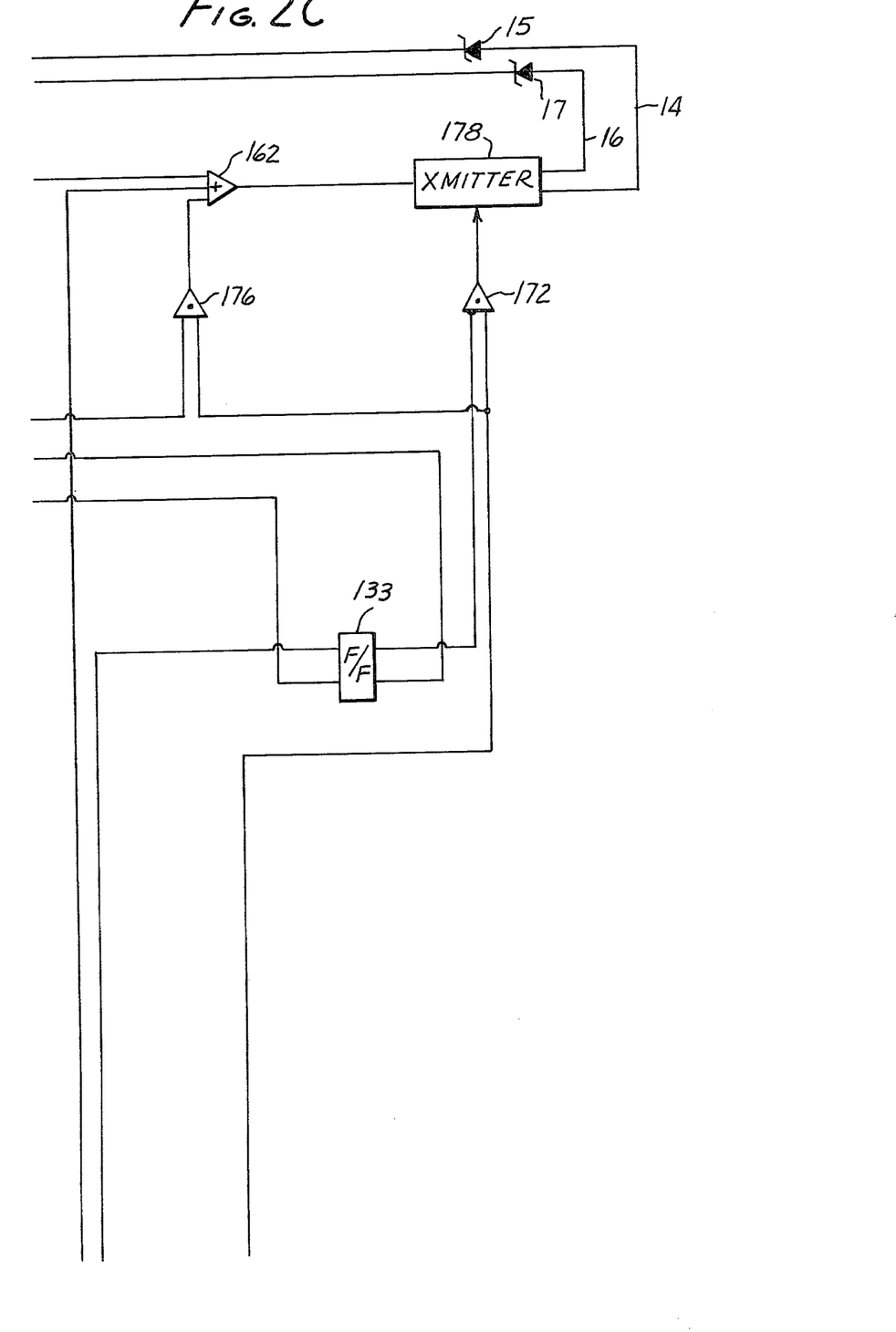

Referring to FIG. 1, there is illustrated a monitor and control system in accordance with the presently preferred embodiment of the present invention. The system includes a configuration and environment monitor (CEM) 10 (shown in greater detail in FIG. 5) connected to a central processing unit (CPU), not shown. A plurality of remote monitors 12a, 12b, 12c, etc., shown in greater detail in FIG. 2, are connected to CEM 10 via clock channel 14, select channel 16 and power channel 18. Each monitor 12 is associated with a peripheral remote station and is operable to respond to commands from CEM 10 to perform specified command and control functions. Also, each monitor 12 is capable of monitoring conditions at the respective peripheral remote station to supply alarm signals and data to the CEM.

As will be more fully understood hereinafter, and particularly in relation to FIG. 5, CEM 10 may control a plurality of clock, select and power channels 14, 16 and 18.

FIG. 2 illustrates a block circuit diagram of a monitor 12 for a peripheral substation in accordance wih the present invention. As shown in FIG. 2, a ten-position Johnson counter 100 is provided. One suitable Johnson counter for inclusion in the circuit shown in FIG. 2 is commercially available from National Semiconductor Corporation as Model No. CD4017BM. A Johnson counter is a well-known multi-state counter which provides an output signal at only one output for each state thereof and which is advanced by an outside source, such as a source of clock pulses from clock channel 14. Thus, when conditioned to one of its output positions, for example output position 5, the Johnson counter will provide a continuous output signal from its output position 5 until a clock pulse steps it to the next position. Thus, like a multi-position switch, the Johnson counter provides single outputs in sequence through its several output positions. A feedback loop 104 conditions a return to the 0 position upon receipt of a clock pulse when in its ninth position. Also, a Johnson counter will "clear" to its 0 position upon initiation of a clear sequence.

A plurality of bridge terminals 101, 103, 105, 107, and 109 are connected on one side to the outputs of respective positions 1, 2, 3, 4, and 5 of Johnson counter 100. The opposite sides of the bridge terminals are connected to respective inputs of OR gate 111. As shown in the drawings, selected bridge terminals are connected by jumper wires, and as will be more fully understood hereinafter, the selective arrangement of jumper wires will determine the address of the particular monitor. Obviously, other suitable selective connection may be accomplished, such as by fusible links, switches and code cards, to name a few.

AND gate 108 has a first input connected to OR gate 111, a second input connected to select channel 16 and a third input connected to inverter 116 which in turn is connected to clock channel 14 to provide inverted clock signals to AND gate 108. AND gate 110 has a first input connected to inverter 113 which is in turn connected to OR gate 111, a second input connected to select channel 16 and a third input connected to clock channel 14.

AND gates 108 and 110 provide inputs to OR gate 120 which in turn provides an output to flip-flop 122 to condition flip-flop 122 to a set condition. The reset input of flip-flop 122 is connected directly to the 0 output position of Johnson circuit 100. The set (or true) output of flip-flop 122 is connected to inverter 124, which in turn provides inputs via line 125 to each of AND gates 126, 128 and 130. Each of AND gates 126, 128 and 130 has inputs connected via line 17 to select channel 16 and also to respective ones of outputs positions 7, 8 and 9 of Johnson counter 100. If desired, AND gates 126, 128 and 130 may also have inputs connected to clock channel 14. This connection would have the advantage of avoiding a continuous operation of an AND gate should counter 100 be halted at an output position 7, 8 or 9. Alternatively, the clock connection may be omitted as shown if the unit commanded is relatively slow operating. The outputs of AND gates 126, 128 and 130 are connected to control specific functions, such as the "on" or "off" condition of the peripheral substation, or the operating condition of the local monitor. (No connections as shown for output position 6 of the Johnson counter for sake of simplicity of the drawings. It is understood that position 6 may be used, such as for other commands or for controlling lower tiered monitors.)

AND gate 132 receives an input via line 131 from the reset output of flip-flop 133 and also from clock channel 14 to provide clock inputs to Johnson counter 100. For purposes to be more fully explained hereinafter, AND gate 132 will provide clock signals to advance the output positions of the Johnson counter only so long as flip-flop 133 remains in a reset position. AND-NOT gate 172 has its NOT input connected to the set output of flip-flop 133 to disable transmitter 178 whenever flip-flop 133 is set; again for purposes to be more fully explained hereinafter.

Figure 3:
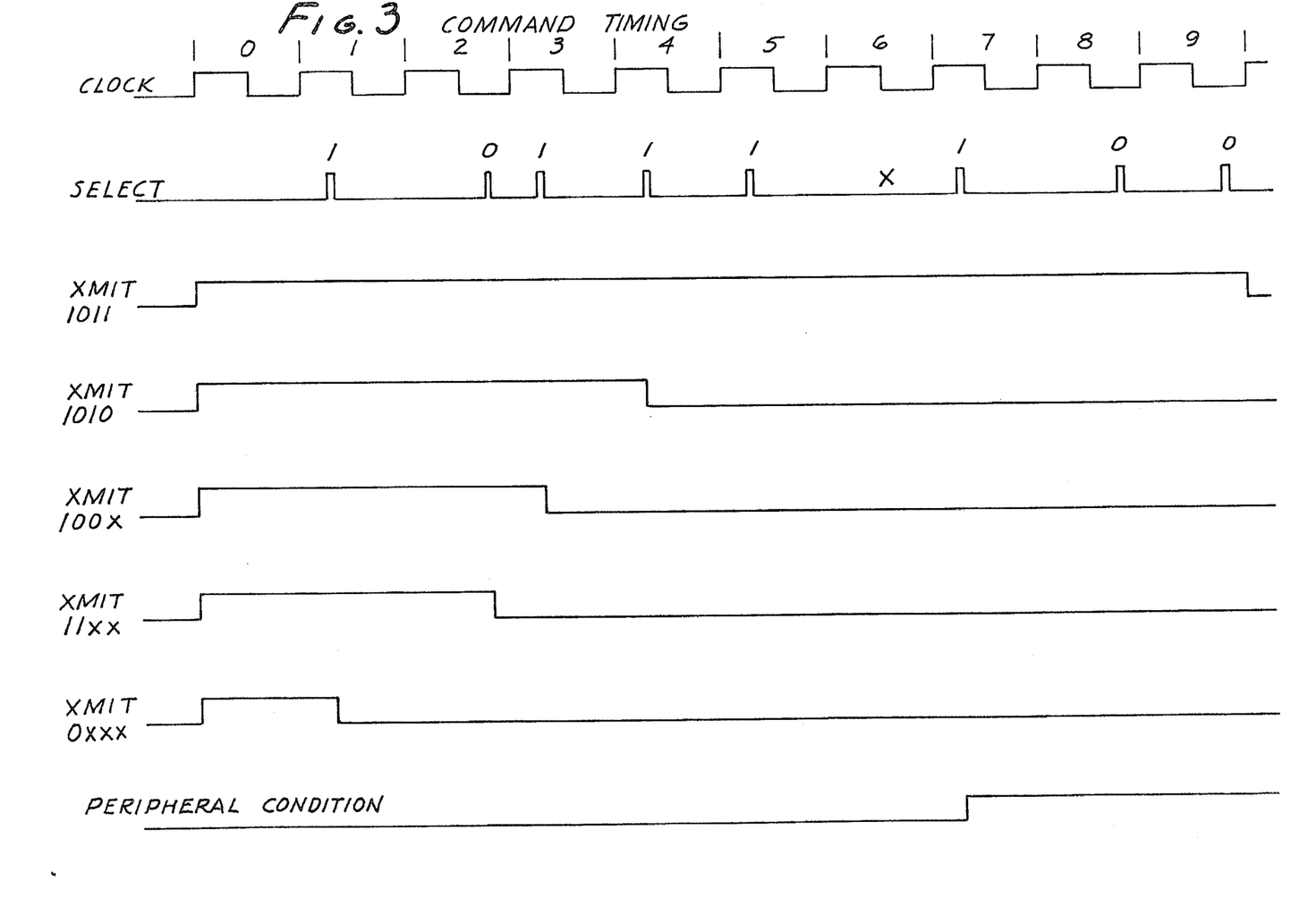
FIGS. 3 and 4 are timing diagrams illustrating various timing aspects of the system in the command and monitor modes, respectively.

With reference to FIGS. 2 and 3, the operation of the monitor in its command mode may be explained. Assume, for purposes of example, there are up to 16 peripheral stations being monitored and commanded, and it is desirable to operate the system to turn "on" the peripheral device in the eleventh station (whose address is 1011). Assume further that flip-flop 133, at least in the eleventh station, is in a reset condition. To accomplish a command, the central station Configuration and Environment Monitor (CEM) 10, acting under the control of a Central Processor Unit (CPU) initiates a series of clock pulses on channel 14 and simultaneously issues a binary word on the select channel 16. With particular reference to FIG. 3, the binary word appearing on the select channel 16 will consist of a series of pulses, selectively occurring during the high and low periods of the clock signal; a select pulse occurring when the clock pulse is high being referred to as "binary 1", whereas a select pulse occurring when the clock pulse is low is referred to as "binary 0".

The first four pulses of the select word will comprise the address of the monitor unit addressed (in this case 1011), the fifth pulse will be a parity pulse (which for example may be "even" parity so there will be an even number of binary 1's in the first five pulses—hence in the example the parity pulse is 1), the sixth pulse is neither a 1 nor a 0 (represented by X in binary notation) because position 6 of the Johnson counter is not being addressed, the seventh pulse will be a 1 (because that corresponds to the output of the Johnson counter desired to be operated), and the eighth and ninth pulses are either 0 or omitted as in the case of bit 6. Hence, the binary word imposed on the sense channel will be 10111X1XX. Also, for purposes of explanation, it will be assumed the Johnson counter is initially in its 0 output position.

For the conditions stated, with all Johnson counters in their 0 output position, a signal from the counter 100 is applied to reset each flip-flop 122 in all monitors. When in a reset condition, flip-flop 122 provides a 0 signal to inverter 124, thereby providing an enable signal to AND gates 126, 128 and 130 of all monitors. AND gates 132 are enabled by virtue of the pre-existing reset condition of flip-flop 133 as hereinafter explained. When flip-flop 122 is set, it provides a "de-select" signal to the NOT input of AND-NOT gate 172 to render transmitter 178 disabled and a "de-select" signal to the inverter 124 to render AND gates 126, 128, and 130 inactive. Hence, with all Johnson counters at their 0 output position, all flip-flops 122 are reset, so all AND gates 126, 128 and 130 are enabled. The NOT side of AND-NOT gate 172 is cleared due to the reset condition of flip-flop 133 which is reset by the signal from the output state of counter 100 via line 135. It will be noted that to enable transmitter 178, a signal must be present from OR gate 170 to operate AND-NOT gate 172. For the present purposes, it will be assumed no such signal exists. During the next clock cycle, all Johnson counters 100 are stepped to their 1 output positions. Those monitors having a jumper wire across bridge terminals 101 will provide a signal through their respective OR gates 111 to an input of their respective AND gates 108, whereas those monitors not having a jumper wire across bridge terminals 101 will provide a signal through their respective inverters 113 to input of their respective AND gates 110. As heretofore assumed, the initial bit on the select channel 16 is a binary 1, so the coincidence of the select bit and the clock pulse on channels 16 and 14 will operate those AND gates 110 enabled through inverter 113. Hence, since only those monitors whose initial bit of their address is a 0 have their AND gates 110 operate, the OR gates 120 of such monitors are operated to set their respective flip-flops 122 to provide a "de-select" signal to inverters 124, thereby removing inputs from their respective AND gates 126, 128 and 130. However, those monitors whose initial bit of their address is 1 do not have AND gate 108 or 110 operated, so flip-flop 122 is not set.

Similarly, during the next output position (i.e., 2) of the Johnson counter, those monitors having a jumper wire across the bridge terminals 103 will supply a signal to their AND gates 108, whereas those monitors not having such a jumper wire will supply a signal to their AND gates 110, as heretofore described. Since in the example the select bit occurs during the low position of the clock pulse, those monitors whose second bit of their address is a 1 will have their AND gates 108 operated to set their respective flip-flops 122, thereby disabling their AND gates 126, 128 and 130. Similarly, during the next clock cycle when the Johnson counters are in their third output position, the flip-flops 122 associated with monitors whose addresses are 1000 and 1001 will be set, and duirng the fourth clock cycle the flip-flop 122 in the monitor whose address is 1010 will be set. Thus, only the monitor whose address is 1011 has not had an AND gate 108 or 110 operated to set its flip-flop 122. Thus, flip-flop 122 of the monitor whose address is 1011 remains reset, thereby enabling its AND gates 126, 128 and 130.

Assuming the parity bit in the select word is correct, and flip-flop 122 of the address monitor is not set, the flip-flop supplies a signal to each AND gate 126, 128 and 130. When Johnson counter 100 provides an output at its seventh position, AND gate 126 is activated by virtue of the coincidence of the "1" select pulse (as well as the enable from inverter 124). Thus, an output from AND gate 126 operates the "on" control (not shown) of the peripheral equipment associated with the particular monitor station.

AND gates 164, 166 and 168 are connected to output positions 7, 8 and 9 of the Johnson counter, as well as to respective ones of monitor inputs designated generally as monitor inputs Nos. 1, 2 and 3. It is understood that a monitor input is a signal input from a sensor or the like, or even from a lower tiered peripheral device. For example, a sensor may be a digital sensor, an analog sensor, or a go/no-go sensor such as a switch. Preferably, however, the sensor should provide a continuous signal, at least for so long as is necessary to operate the apparatus according to the present invention. For example, latches (not shown) may be set by an alarm condition, which will hold the alarm signal (even a momentary condition), until cleared by the CEM (such as by a "monitor control" command). The monitor signal also provides inputs to OR gate 170 to provide an enable signal via line 171 to the AND input of AND-NOT gate 172. Also, the outputs of AND gates 164, 166 and 168 provide inputs to OR gate 174 whicn in turn provides an input via line 175 to OR gate 162. The output of OR gate 170 also provides one input via line 171 to AND gate 176, whose other input is received from the 0 output state of Johnson counter 100 via line 177, to provide a signal to OR gate 162. Also, OR gate 162 receives an input via line 161 from OR gate 111. The output of OR gate 162 is connected to transmitter 178 which transmits a state representing a transmitted 1 to 0 bit onto select channel 16 and onto clock channel 14 in a differential mode for transmission to the CEM. As will be explained hereinafter, these signals, being in the differential mode, are not strong enough to operate other remote stations or be interpreted by other stations as clock or select signals.

Figure 4:
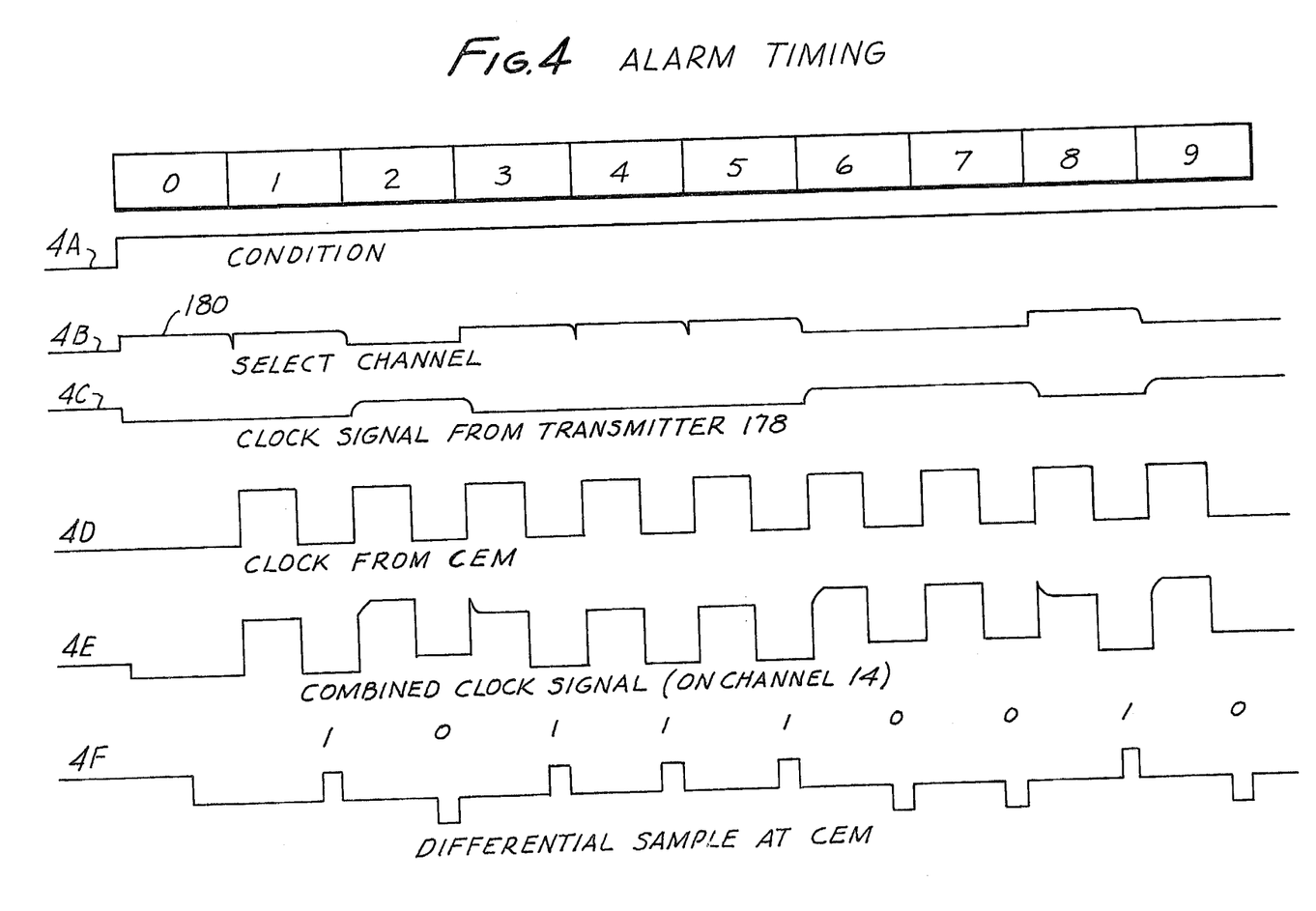

In operation of the apparatus in its monitor mode, with reference to FIG. 4, and assuming the Johnson counters are all in their 0 output states and all flip-flops 122 are in a reset condition, when an abnormal condition occurs, the sensor monitoring the condition provides a signal onto the respective monitor line for the respective substation. For example, for purposes of illustration assume that the sensor associated with monitor line number 2 of the station whose address is 1011 senses an abnormal condition. Thus, a signal indicative of the abnormal condition is supplied to AND gate 166 and to OR gate 170. Operation of OR gate 170 operates AND-NOT gate 172 (the NOT side of the gate being 0 due to the reset condition of flip-flop 133) and to operate AND gate 176 (the other side of the gate being 1 due to the fact that Johnson counter 100 is in its 0 output state). Transmitter 178, being enabled by gate 172, transmits a signal state differentially onto select channel 16 and clock channel 14; the signal state being shown at reference numeral 180 in FIG. 4. As shown particularly in association with waveform 4B and 4C in FIG. 4, the signals imposed onto channels 14 and 16 by transmitter 178 are opposite in polarity to derive a differential signal as between them.

Upon receipt of differential state 180 on select channel 16 and clock channel 14, CEM 10 detects that state (which is indicative of an alarm condition on the system) and initiates an interrogation sequence. Specifically, CEM 10 initiates a series of clock pulses (waveform 4D) onto clock channel 14 to initiate sequential operation of all Johnson counters in all monitor stations 12a . . . 12n. As shown at waveform 4E in FIG. 4, the clock signal produced by the CEM is combined with the clock portion of the differential signal provided by the operated transmitter 178.

For each output position 1–5 of Johnson counter 100, OR gate 111 will, or will not, pass a signal, depending on whether or not a jumper wire bridges the associated bridge terminals. Thus, each station will, as the clock signal steps the Johnson counter, supply to its respective OR gate 162 (and transmitter 178) a signal having characteristics corresponding to its address and parity. In the example given where the station whose address is 1011 initiated the alarm, that station will supply a high signal onto channel 16 when the Johnson counter is in its first, third, fourth and fifth output positions (the fifth corresponding to the "1" parity bit) and a low signal when the counter is in the second output position. Similarly, all other stations will generate their address signals, but since only the station which initiated the alarm condition has its transmitter enabled by gate 172, only that station's address will be actually transmitted. It should be noted that since the CEM sends no select signals onto select channel 16, there ordinarily would be no coincidence of signals on the select channel with either the clock, or inverse clock, signals to cause operation of any of flip-flop 122 to disable any of transmitters 178. However, the transmitting station causes its address to be transmitted partly onto select channel 16 which seemingly would be detected by all stations to force deselect of all flip-flops 122. This undesirable condition is cured by providing voltage sensitive AND gates 108 and 110 which operate, for example, only in response to input signals greater than a preselected voltage, for example 3 volts. The CEM is designed to produce clock and select signals greater than the preselected minimum (for example, 10 volts), and the Johnson counter is likewise designed to provide output signals greater than the selected minimum (also 10 volts). However, transmitters 178 are designed to produce differential signals for the select clock lines at less than the preselected minimum (such as 1 volt) so the signals on select and clock channels 16 and 14 generated by transmitter 178 of the operated station are insufficient to operate any of AND gates 108 and 110 in the monitors. Hence, all flip-flops 122 remain in their reset position and no transmitter is disabled by flip-flop 133. (Of course, only the transmitter 178 associated with the operated sensor is enabled by gate 172.) Zener diodes 15 and 17 may be inserted in series with the transmitter connection to clock channel 14 and select channel 15 to assure that even if several transmitters 178 are simultaneously activated (as, for example, a fault condition in several stations), the total size of the signals on the clock and select lines will not exceed the threshold voltage of voltage sensitive AND gates 108 and 110.

It should be noted that it is possible for another station to sense an alarm condition and hence enable its transmitter during an interrogation, but such an occurrence is unlikely. Further, if such simultaneous condition were to occur, the message returned onto the select channel to the CEM would probably be garbled, or wrong in parity, so the CEM can initiate other interrogation sequences (to be described below) to ascertain the status of each monitor station. In the example given, where the station whose address is 1011 initiated the alarm condition, the address and parity bit of only that station (namely, "10111") is supplied onto the select channel 16 and clock channel 14 pair.

As the Johnson counters 100 continue to step, the AND gate associated with the operated sensor will provide a "1" bit during the corresponding output position. In the example given where the sensor associated with the second monitor line of the station (corresponding to Johnson counter output position 8) operated, a differential signal state will be supplied via transmitter 178 onto clock channel 14 and select channel 16 during the corresponding clock period. Hence, a unique binary word is impressed, one bit at a time, onto channels 14 and 16 indicative of the address and fault condition of the sensor which operated, the binary word being received by the CEM for storage in memory there and suitable output. As will be more fully explained hereinafter, the CEM samples the differential states on the clock and select channels during the second (or "false") part of the clock cycle. Thus, the receiver 204 (FIG. 5) is conditioned to respond to the differential values of the signals on the clock and select lines to derive waveform 4F in FIG. 4 indicative of the address of the station transmitting the fault condition and of the nature of the fault.

One feature of the present invention resides in the accomplishment of functions by blending command and monitor controls. For example, to render a selected peripheral station to an "off" condition, the address of the selected station is sent by the CEM on the select channel, followed by a select bit at the eighth Johnson counter position. However, to turn off all peripheral stations simultaneously, such as for system shut-down, the CEM will initiate a clock signal sequence to step the Johnson counters, but will send no address on the select channel. As a result, none of the flip-flops 122 in the several stations will be set, so none of the AND gates 126, 128 or 130 are disabled. Consequently, when a select bit appears during the eighth setting of the Johnson counter, all stations respond through their AND gates 128 to turn off the respective peripheral device.

From the foregoing, another feature of the present invention becomes evident. It is possible to perform certain commands at more than one, but less than all, of the monitors. For example, if it is desired to turn on all peripheral equipment, but power constraints dictate that all peripheral equipment cannot be turned on simultaneously, half the units can be turned on in one command sequence and the other half during another command sequence. This may, for example, be accomplished by transmitting an address consisting of an initial "1" bit (thereby disabling all units whose initial address bit is "0"), followed only by all clock signals until reaching the seventh Johnson output position whereupon a "1" bit command on select line 16 causes operation of all perpheral devices assocated with monitors whose initial address bit is "1". Thereafter, the sequence may be repeated with an initial "0" address bit to operate the remaining units. Obviously this technique may be further broken down to operation of smaller numbers of units, the only criterion being that the addresses of the selected stations be consistent with the foregoing principles.

To monitor the condition of a selected peripheral station (i.e., to ascertain the status of the monitor in a selected station), the CEM may initiate a command sequence, except that after transmitting the selected station address onto the select channel (thereby disabling the transmitters in all non-selected stations) the CEM will shift to a listen mode and advance the Johnson counter in the selected station through positions 6–9 without sending further select signals. If one of the monitors associated with the selected station is operated (i.e., senses an abnormal condition), upon reaching the corresponding position in the Johnson counter that station will transmit a differential state onto select and clock channels 16 and 14 as heretofore described in connection with the alarm mode. This sequence is particularly useful in the event that two or more stations simultaneously transmit alarm signals to the CEM during a monitor or alarm sequence. In particular, by individually checking the status of each suspected station, the correct alarm conditions and location can be ascertained.

Another feature resides in the ability to disable a monitor (for example if an alarm signal is received and logged, it may be desirable to logically disconnect that monitor to prevent its subsequent interference with operation of the system). This is accomplished by addressing only that station and commanding logical disconnect by transmitting a select bit during the ninth state of the Johnson counter. AND gate 130 in the addressed station will be operated to set flip-flip 133 via line 129 thereby disabling that station's transmitter by imposing a disable signal onto the NOT input of AND-NOT gate 172 and to remove the enable input to AND NOT gate 132 to prevent further response of the Johnson counter to clock signals. The disconnected monitor may only be returned to service by a master clear, as hereinafter explained.

As shown in FIG. 1, power channel 18 supplies power to all remote monitor stations. The power channel is also useful to reset all Johnson counters 100 to the 0 output position to perform a master clear command. Particularly, the Johnson counters are arranged to respond to a power off sequence to reset to the zero output position upon re-application of the power, regardless of what the output position was prior to the power off condition. This is accomplished by a one-shot circuit 19 connected to the clear input of Johnson counter 100 having its logic input connected through capacitor 21 to ground. With power initially in a down or zero state condition, when power is raised, capacitor 21 charges for a few microseconds to turn on the one-shot circuit 19 to operate the clear control of the counter to reset the counter. When the capacitor is fully charged, the one-shot turns off. Thus, whenever it is desired to reset the Johnson counters, power is momentarily dropped (off) and then reapplied.

Figure 5:
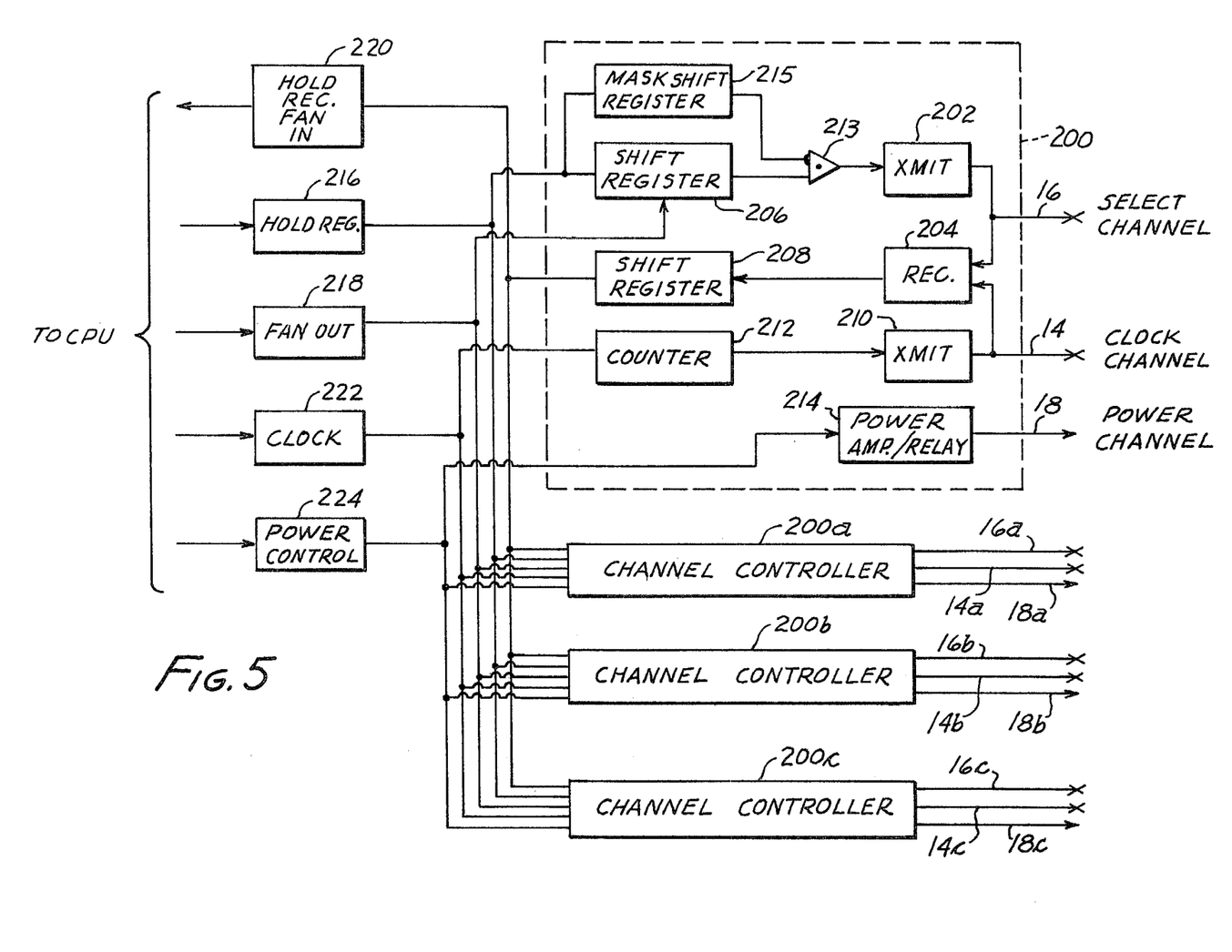
FIG. 5 is a block circuit diagram of a configuration and environment monitor for use in the system illustrated in FIG. 1.

FIG. 5 illustrates a Configuration and Environment Monitor (CEM) 10 for use with monitors 12 shown in FIG. 2. The CEM includes a plurality of channel controllers 200, 200a, 200b and 200c, each having separate select, clock and power channel output 14, 16 and 18 for connection to monitors 12. Typically, and as heretofore described, each channel can accommodate up to sixteen monitors, so each channel controller controls each channel of up to sixteen monitors, and the CEM can, with four channel controllers and associated channels, accommodate up to sixty-four monitors 12.

Each channel controller 200 includes a transmitter 202 connected to select channel 16 and a receiver 204 differentially connected to clock and select channels 14 and 16. A shift register 206 provides data to be transmitted on the select channel, such a monitor addresses and commands as heretofore described, particularly in connection with FIG. 3. Another shift register 208 receives data from the clock and select channel pair, such as monitor addresses and alarm condition data as heretofore described, particularly in connection with FIG. 4. A transmitter 210 transmits clock pulses determined by counter 212 onto clock channel 14, and a power amplifier or relay 214 provides an output onto channel 18. Mask shift register 215 provides blocking of the outputs of shift register 206 through AND-NOT gate 213 so that neither a 1 nor 0 bit is impressed on select channel 6 (as in the case of bit 6). Alternatively, by command from the CPU, before a transmit command from the CPU is set to shift register 206, a shift mask may be placed in shift mask register 215. Upon a transmit command from the CPU, both shift registers 206 and 215 are advanced in step, and the contents of shift register 206 are transmitted onto select channel 16 whenever 0's appear in the corresponding location of shift mask register 215. This function is accomplished by AND-NOT gate 213, which blocks the outputs from shift register 205 whenever a 1 is present at the NOT input of gate 213 from register 215. A transmit command not preceded by a mask command will cause the contents of register 216 to be transmitted in their entirety. A binary 1 output from register 215 to gate 213 will block the corresponding output from register 206 from being transmitted, so neither a 1 nor a 0 is transmitted onto select channel 16 (as in the command example of bit 6 given earlier). If certain bits are always to be blocked, the mask logic may be hardwired to accomplish that result.

The mask register 215 is particularly useful for inhibiting he transmission of select signal bits into select channel 16 even though clock signals are transmitted onto clock channel 14. For example, as heretofore explained in connection with command functions, if it is desirable to command all remote stations to perform a given function, such as system shut-down, the mask register 215 and AND-NOT gate 213 may cooperate to mask out all select signal address bits and command bits, other than the command signal associated with the desired function. For example, for system shut-down, the mask signals from the mask register may consist of binary 1's at all positions except the eighth position so only a single pulse will appear on the select channel, and only when all counters 100 in the remote stations have advanced to their eighth output position.

Hold register 216 receives inputs from the Central Processor Unit (CPU) and provides data (such as masks, monitor addresses and commands) to shift registers 206 and 215. Fan out control 218, which also operates under control of the CPU, controls the shift registers 206 and 215 so that the proper shift register 206 or 215 receives the correct transmission data. Hold register and fan in control 220 receives monitor addresses and alarm condition data from shift registers 208 for fan-in control to the CPU. Controls (not shown) are provided to control the transmitters 202 and receivers 204 to selectively operate the sending and receiving (listening) conditions heretofore described. Master clock 222, operating under control of the CPU provides clock inputs to counters 212, and power control 224 provides control to the power amplifiers or power relays 214.

The counters 212 are controlled to provide the specific number of clock pulses (i.e., ten) for each command or monitor operation heretofore described.

Several features of the present invention result from the fact that the CEM samples the differential states on the clock and select channels during the second (or "false") part of the clock cycle. First, the effects of any propagated disturbances from the Johnson counters have dissipated and the lines are essentially quiescent during the second or "false" part of the clock cycle.

Thus, the signal from a transmitter 178 in a transmitting station has had most of the duration of the first or "true" part of the clock cycle to settle out, and sampling of the differential signal may be optimized about and derived from the trailing edge of the first or "true" part of the clock waveform shown in FIG. 4E. Furthermore, since the length of channels 14 and 16 is, in part, constrained by the propagation delays of the signals, and hence the duty cycles of the clock signal, it is possible to extend the length of the channels merely by varying the duty cycle by making the second or false part of the clock cycle longer. This in effect permits longer propagation delays and longer channel lines without serious reduction in the speed of the overall system. Hence, the bit-by-bit advance and response communication techniques permits essentially non-synchronous communications all under strict control of the CEM.

The present invention thus provides a command and monitor system for controlling operations in peripheral units and for monitoring malfunctions and communicating alarm signals to the central station. The CPU provides control over the entire system, as well as output indications of alarm conditions so that field engineers can be dispatched to correct malfunctions. The apparatus is effective in operation and provides efficient control and alarm monitoring operations.

This invention is not to be limited by the embodiment shown in the drawings and described in the description, which is given by way of example and not of limitation, but only in accordance with the scope of the appended claims.

What is claimed is:

1. In a command and monitoring system having a central station and a plurality of remote stations, a remote station comprising: counter means having a plurality of output states; address means connected to a first plurality of said output states of said counter means for establishing a unique address for said remote station; clock channel means connecting said counter means to said central station for supplying clock signals to said counter means for sequencing said counter means through its output states; select channel means connected between said central station and said remote station, said central station supplying select signals onto said select channel means; monitor means for receiving a plurality of monitor condition signals, said monitor means being connected to a second plurality of said output states of said counter means other than said first plurality of said output states; transmitter means connected to said address means and to said monitor means for transmitting address and monitor data onto said select channel means; control means connected to said select channel means and to said second plurality of said output states of said counter means and responsive to a select signal when said counter means has conditioned one of its respective second output states for operating a corresponding command function at said remote station; disable means for selectively disabling said control means; and selective means connected to said address means and said select channel means and responsive to the unique address for the remote station and to select signals on said select channel means to operate said disable means whenever such select signals correspond to an address other than the address for the respective remote station.

2. Apparatus according to claim 1 wherein said address means comprises OR gate means having a plurality of inputs selectively connected to each of said first output states of said counter means.

3. Apparatus according to claim 1 wherein said monitor means comprises a plurality of AND gate means each having a first input connected to respective ones of said second output states of said counter means and a second input each connected to receive respective ones of said monitor condition signals, OR gate means connected to each of said AND gate means for supplying monitor data to said transmitter means, and further gate means connected to supply each of said monitor condition signals to said transmitter means, said transmitter means including enable means responsive to said further gate means to inject a signal onto said select channel means.

4. Apparatus according to claim 3 wherein said further gate means is an OR gate.

5. Apparatus according to claim 3 wherein said enable means includes AND gate means responsive to operation of said further gate means when said counter means is in an output state other than one of said first and second plurality of output states.

6. Apparatus according to claim 1 wherein said control means comprises a plurality of AND gate means each having a first input connected to said disable means, a second input connected to said select channel means and a third input connected to respective ones of said second output states of said counter means.

7. Apparatus according to claim 6 further including further AND gate means having an input connected to said clock channel means and having an output connected to said counter means to supply clock signals to said counter means, and second disable means connected to said further AND gate means and responsive to operation of a selected one of said first-named AND gate means to inhibit said further AND gate means from supplying clock signals to said counter means.

8. Apparatus according to claim 1 wherein said selective means comprises first AND gate means having a first input connected to said address means, a second input connected to said select channel means and a third input connected to receive an inverted clock signal from said clock channel means, second AND gate means having a first input connected to receive an inverted address signal from said address means, a second input connected to said select channel means and a third input connected to said clock channel means, and first OR gate means connected to the outputs of said first and second AND gate means.

9. Apparatus according to claim 8 wherein said disable means comprises a flip-flop having its set input connected to the output of said first OR gate means an its reset input connected to a selected one output state of said counter means, said selected one output state being an output state other than any of said first and second output states, whereby said first AND gate means is operable to set said flip-flop upon the correspondence of a bit of a first type in an address signal portion of said select signal with a bit of a second type in the address of the respective remote station and said second AND gate means is operable to set said flip-flop upon the correspondence of a bit of said second type in said address signal portion of said select signal with a bit of said first type in the address of the respective remote station, said flip-flop being operable to enable said control means when in it reset condition.

10. Apparatus according to claim 9 wherein said monitor means comprises a plurality of fourth AND gate means each having a first input connected to respective ones of said second output states of said counter means and a second input each connected to receive respective ones of said monitor condition signals, second OR gate means connected to each of said fourth AND gate means for supplying monitor data to said transmitter means, and further gate means connected to supply each of said monitor condition signals to said transmitter means, said transmitter means including enable means responsive to said further gate means to inject a signal onto said select channel means.

11. Apparatus according to claim 10 wherein said control means comprises a plurality of fifth AND gate means each having a first input operable when said flip-flop is in its reset condition, a second input connected to said select channel means and a third input connected to respective ones of said second output states of said counter means.

12. Apparatus according to claim 1 wherein said disable means comprises a flip-flop having its set input connected to said selective means and its reset input connected to a selected one output state of said counter means, said selected one output state being an output state other than any of said first and second output states, said selective means being operable in response to the correspondence of a bit of a first type in the address of the respective remote station with a bit of a second type in an address signal portion of said select signal and in response to the correspondence of a bit of said second type in the address of the respective remote station with a bit of the first type in said address signal portion of said select signal, said flip-flop being operable to enable said control means when in its reset condition.

13. Apparatus according to claim 1 further including gate means having its output connected to supply clock signals to said counter means, second disable means responsive to a selected command function from said control means for inhibiting said gate means from supplying clock signals to said counter means.

14. Apparatus according to claim 13 wherein said gate means is and AND gate having a first input connected to said clock channel means and a second input connected to said disable means.

15. Apparatus according to any of claims 1 to 14 wherein said counter means is a Johnson counter.

16. Apparatus according to any of claims 1 to 14 wherein said central station includes first register means for supplying said select signals onto said select channel means, second register means for supplying mask signals representative of select signal to be inhibited from being supplied onto said select channel means, and inhibit means responsive to said mask signals and connected between said first register means and said select channel means for inhibiting the supplying of select signals onto said select channel means from said first register means.

17. Apparatus according to any of claims 1 to 14 wherein said transmitter means is also connected to said clock channel means and is arranged to transmit address and monitor data differentially onto said select channel means and said clock channel means.

18. In a command and monitoring system having a central station and a plurality of remote stations, said central station being linked to each of said remote stations by first and second communications channels, the method of signalling between said central station and said remote stations comprising:

(a) at said central station, transmitting onto said first communication channel a clock signal having a predetermined series of spaced-apart pulses;

(b) at each receiving station, receiving said clock signal and advancing the state of a multi-state device with each pulse of said clock signal;

(c) at said central station, transmitting onto said second communication channel an information signal having a predetermined series of pulses each occurring simultaneously with the transmission of either a pulse of said clock signal or the space between successive clock signal pulses;

(d) at each of said receiving stations, receiving and decoding said information signal to selectively enable said receiving station to transmit a data signal onto said second communication channel; and (e) at said central station, selectively inhibiting the transmitting of portions of said information signal to permit receipt of a data signal from a remote station.

19. The method according to claim 18 wherein each remote station includes address-responsive means connected to said second communication channel and to selected states of its respective multi-state device and responsive to a unique address signal portion of said information signal, said method further including transmitting a unique address signal as part of said information signal to address a selected remote station.

20. The method according to claim 19 further including inhibiting the transmitting of portions of said address signal to address a predetermined group of selected remote stations.

21. The method according to either of claims 19 or 20 further including transmitting a control signal as part of said information signal, and responding to said control signal at each of said selected remote stations to perform a predetermined control function thereat.

22. The method according to claim 19 wherein each remote station includes means for monitoring a condition, said method further including inhibiting the transmitting of that portion of said information signal which does not include said address signal and said selected remote station transmitting said data signal representative of the monitored condition.

23. The method according to claim 18 further including, at each remote station, responding to a monitor condition to transmit an alarm signal onto said second communication channel; at said central station responding to said alarm signal to transmit said clock signal and inhibit said information signal; said transmitting remote station responding to the successive states of its multi-state device to transmit said data signal representative of the remote station address and the monitor condition.

24. The method according to either of claims 22 or 23 wherein said data signal is transmitted differentially onto said first and second communication channel.

25. In a command and monitoring system having a central station and a plurality of remote stations and first and second communications channels linking said central station to each of said remote stations, apparatus for signalling between said central stations and said remote stations comprising:

(a) first transmitter means at said central station for transmitting a clock signal onto said first communication channel, said clock signal comprising a predetermined series of spaced-apart pulses;

(b) second transmitter means at said central station for transmitting an information signal onto said second communication channel, said information signal comprising a predetermined series of pulses selectively occurring simultaneously with either a clock signal pulse or the space between successive clock signal pulses;

(c) counter means at each of said remote stations, each of said counter means having a plurality of output states, said counter means each being connected to said first communication channel to receive said clock signal to sequentially advance said counter means through its output states by the pulses of said clock signal;

(d) decoder means at each of said remote stations connected to said second channel to decode said information signal to perform a selected control function; and (e) inhibit means at said central station for selectively inhibiting said second transmitter means, whereby a portion of said information signal may be inhibited from being transmitted onto said second communication channel.

26. Apparatus according to claim 25 further including third transmitter means at each of said remote stations for transmitting a data signal onto said second communication channel, means for enabling said second transmitter means, and means at said central station for operating said inhibit means when one of said third transmitter transmits a data signal.

27. Apparatus according to claim 26 wherein each of said third transmitter are connected to both said first and second communications channels to transmit said data signal differentially onto said first and second communications channels.

28. Apparatus according to either of claims 26 or 27 further including address generation means at each of said remote stations arranged with the respective counter means for forming a unique signal as said clock signal advances the output state of said counter means, and means connecting said address generation means to the respective third transmitter means for transmitting said address signal as part of said data signal.

29. Apparatus according to any of claims 25 to 27 wherein said decoder means includes address responsive means responsive to a unique address portion of said information signal, said decoder means enabling the performance of a selected control function only at the remote station addressed by said information signal.

* * * * *

UNITED STATES PATENT AND TRADEMARK OFFICE
CERTIFICATE OF CORRECTION

PATENT NO. : 4,298,860
DATED : November 3, 1981
INVENTOR(S) : G. R. Norberg & L. R. Hartung It is certified that error appears in the above—identified patent and that said Letters Patent is hereby corrected as shown below:

Column 16, line 7 (Claim 27, line 2) after "transmitter" read --means--

Signed and Sealed this

Twelfth Day of January 1982

[SEAL]

Attest:

GERALD J. MOSSINGHOFF

Attesting Officer     Commissioner of Patents and Trademarks